United States Patent
Norrby et al.

(10) Patent No.: US 11,829,369 B2
(45) Date of Patent: Nov. 28, 2023

(54) DATA EXTRACTION WITH USER-CONFIGURABLE EXTRACT TEMPLATES

(71) Applicant: Nasdaq Technology AB, Stockholm (SE)

(72) Inventors: Magnus Norrby, Bromma (SE); Saker Asllan, London (GB); Yulia Havriuk, Khmelnytsky (UA); Mikael R. Nilsson, Hägersten (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 232 days.

(21) Appl. No.: 17/135,289

(22) Filed: Dec. 28, 2020

(65) Prior Publication Data

US 2022/0207034 A1    Jun. 30, 2022

(51) Int. Cl.
    *G06F 16/2457*    (2019.01)
    *G06F 16/23*    (2019.01)

(52) U.S. Cl.
    CPC ...... *G06F 16/2457* (2019.01); *G06F 16/2379* (2019.01)

(58) Field of Classification Search
    CPC ............ G06F 16/2457; G06F 16/2379; G06F 16/245; G06F 16/252; G06F 16/2428
    See application file for complete search history.

(56) References Cited

U.S. PATENT DOCUMENTS

| | | | |
|---|---|---|---|
| 6,789,077 B1 * | 9/2004 | Slaughter | H04L 41/22 707/E17.115 |
| 2002/0023158 A1 * | 2/2002 | Polizzi | G06F 16/958 715/236 |
| 2006/0015483 A1 * | 1/2006 | Gownder | G06F 16/2438 |
| 2015/0020010 A1 * | 1/2015 | Hale | G06F 3/04842 715/765 |
| 2017/0109341 A1 | 4/2017 | Issa | |
| 2017/0142161 A1 * | 5/2017 | Riley | G06Q 10/105 |
| 2017/0223003 A1 * | 8/2017 | Miles | G06F 21/6254 |
| 2018/0341657 A1 | 11/2018 | Labbi | |

FOREIGN PATENT DOCUMENTS

WO    /K.W.H. A1    11/2012
      /2012/154573

OTHER PUBLICATIONS https://en.wikipedia.org/wiki/Select_(SQL)#:~:text=An%20asterisk%20(%22%20*%20%22),s)%20to%20retrieve%20data%20from (Year: 2004).*
PCT Notification of Transmittal of the International Search Report and Written Opinion for Application No. PCT/EP2021/086972 dated Mar. 22, 2022, 12 pages.

* cited by examiner

*Primary Examiner* — Mark D Featherstone
*Assistant Examiner* — Kweku William Halm
(74) *Attorney, Agent, or Firm* — Nixon & Vanderhye, PC

(57) ABSTRACT

The described technology relates to systems and techniques for providing efficient and easy-to-use user-customizable extract templates for running queries against databases. The user-customizable extract templates enable customization of the same predefined query according to the requirements and privileges of respective users. In particular, embodiments enable customization of queries by users themselves, reducing or altogether eliminating having developers to modify the query or associated extract templates while still allowing the data owners or administrators to control access to the data.

18 Claims, 18 Drawing Sheets

```
title: Transactional View
query: "with                    603
  ototal as (
  select
   marketcode as exchange
   ,assetcode as security
   ,date
   ,time
   ,timezone
   ,(case
             when ordertype = 4 then 'AMEND'
             when ordertype = 1 then 'ORDER'
             when ordertype = 2 then 'TRADE'
             when ordertype = 3 then 'CANCEL'
         end) as transactionType
   ,(case
             when orderverb = 2 then ' ASK'
             when orderverb = 1 then ' BID'
             else ''
         end) as orderDirection
   ,participantcode as houseCode
   ,coalesce(CASE when ordertype = 2 then executedquantity else quantity end,0) as volume
   ,coalesce((CASE when ordertype = 2 then executedprice else price end)/(case when deliverydecimals
      is null OR deliverydecimals = 0 then 1.0 else pow(10.0,deliverydecimals) end),0) as price
   ,tradingaccountcode as account
   ,actorcode as trader
   ,IF(orderid=0,null,orderid)AS orderId
   ,(CASE when ordertype = 2 then executedquantity else quantity end) - displayquantity as undisclosedVolume
   ,coalesce(((CASE when ordertype = 2 then executedquantity else quantity end)*
      (CASE when ordertype = 2 then executedprice else price end)/(case when deliverydecimals is null OR
      deliverydecimals = 0 then 1.0 else pow(10.0,deliverydecimals) end)),0) as value
   ,tradingaccounttypecode as accountType
   ,IF(tradeid=0,null,tradeid)AS tradeId
   ,IF(orderid=0,null,orderid)AS internalOrderId
   ,IF(tradeid=0,null,tradeid)AS internalTradeId
   ,currencycode as currency
   ,flags
   from dsevents.dsorderevent
   where refdate BETWEEN date_format(:date_from,'%Y-%m-%d') AND date_format(:date_to,'%Y-%m-%d')
     and (orderid in (:orderId) OR (:orderId) IS NULL)
     and (tradeid in (:tradeId) OR (:tradeId) IS NULL)
     and ((orderverb = 1 and 'Bid' in (:orderDirection)) or (orderverb = 2 and 'Ask' in (:orderDirection))
       or coalesce(:orderDirection,'')='')
     and (marketcode in (:exchange) or (:exchange) IS NULL)
     and (assetcode in (:security) or (:security) IS NULL)
     and (tradingaccountcode in (:account) or (:account) IS NULL)
     and (participantcode in (:houseCode) or (:houseCode) IS NULL)
     and (actorcode in (:trader) or (:trader) IS NULL)
     and (time >= :time_from or :time_from IS NULL)
     and (time <= :time_to or :time_to IS NULL)
  ),
  trview as (
  select * from ototal
  where (value >= :value_from OR :value_from IS NULL)
    and (value <= :value_to OR :value_to IS NULL)
    and (volume >= :volume_from OR :volume_from IS NULL)
    and (volume <= :volume_to OR :volume_to IS NULL)
    and (price >= :price_from OR :price_from IS NULL)
    and (price <= :price_to OR :price_to IS NULL)
    and (contains(transform(array[:transactionType ], t -> upper(t)),transactionType)
      OR (:transactionType) IS NULL)
    and (accountType in (:accountType) OR (:accountType) IS NULL)
```

```
          and (internalOrderId in (:internalOrderId) or (:internalOrderId) IS NULL)
          and (internalTradeId in (:internalTradeId) or (:internalTradeId) IS NULL)
          and (currency in (:currency) or (:currency) IS NULL)
          and (arrays_overlap(array[:flags ], split(flags, ' ')) or (:flags) IS NULL)
      ),
      totalResultCount as (
        select count (*) as totalresultcount from trview
      )
      select * from trview, totalResultCount"

parameters:

date_from:
        name: date_from
        dataType: DATE
        mandatory: true
        valueQuery: 'select distinct refdate as date from dsevents.dsorderevent order by 1' date_to:
        name: date_to
        dataType: DATE
        mandatory: true exchange:
        name: exchange
        dataType: STRING_ARRAY
        mandatory: false
        valueQuery: "select distinct code as markets from rdm.market order by 1"

security:
        name: security
        dataType: STRING_ARRAY
        mandatory: false account:
        name: account
        dataType: STRING_ARRAY
        mandatory: false trader:
        name: trader
        dataType: STRING_ARRAY
        mandatory: false houseCode:
        name: houseCode
        dataType: STRING_ARRAY
        mandatory: false
        valueQuery: "select distinct code as houseCode from rdm.participant order by 1"

transactionType:
        name: transactionType
        dataType: STRING_ARRAY
        mandatory: false
        valueQuery: "select 'Trade' as transactionType union select 'Order' as transactionType union select
          'Amend' as transactionType  union select 'Cancel' as transactionType"

orderDirection:
        name: orderDirection
        dataType: STRING
        mandatory: false
        valueQuery: "select 'Bid' as orderDirection union select 'Ask' as orderDirection"
```

```
orderId:
  name: orderId
  dataType: NUMERICAL_ARRAY
  mandatory: false tradeId:
  name: tradeId
  dataType: NUMERICAL_ARRAY
  mandatory: false value_from:
  name: value_from
  dataType: NUMERICAL
  mandatory: false value_to:
  name: value_to
  dataType: NUMERICAL
  mandatory: false volume_from:
  name: volume_from
  dataType: NUMERICAL
  mandatory: false volume_to:
  name: volume_to
  dataType: NUMERICAL
  mandatory: false price_from:
  name: price_from
  dataType: DECIMAL
  mandatory: false price_to:
  name: price_to
  dataType: DECIMAL
  mandatory: false accountType:
  name: accountType
  dataType: STRING_ARRAY
  mandatory: false
  valueQuery: 'select distinct code as accountType from rdm.tradingaccounttype order by 1' internalOrderId:
  name: internalOrderId
  dataType: NUMERICAL_ARRAY
  mandatory: false internalTradeId:
  name: internalTradeId
  dataType: NUMERICAL_ARRAY
  mandatory: false currency:
  name: currency
  dataType: STRING_ARRAY
  mandatory: false
  valueQuery: 'SELECT DISTINCT code FROM rdm.asset AS currency WHERE assetsubclassid = 1
    ORDER BY 1'
```

606 {
```
selectedColumns:
  name: selectedColumns
  dataType: STRING_ARRAY
  mandatory: false time_from:
  name: time_from
  dataType: TIME
  mandatory: false time_to:
  name: time_to
  dataType: TIME
  mandatory: false flags:
  name: flags
  dataType: STRING_ARRAY
  mandatory: false
```

608 {
```
outputColumns:
  -
  name: exchange
  type: STRING
  -
  name: security
  type: STRING
  -
  name: date
  type: DATE
  -
  name: time
  type: TIMESTAMP
  -
  name: transactionType
  type: STRING
  -
  name: orderDirection
  type: STRING
  -
  name: houseCode
  type: STRING
  -
  name: volume
  type: NUMERICAL
  -
  name: price
  type: DECIMAL
  -
  name: account
  type: STRING
  -
  name: trader
  type: STRING
  -
  name: orderId
  type: NUMERICAL
```

608 {
```
  -
  name: value
  type: NUMERICAL
  -
  name: accountType
  type: STRING
  -
  name: tradeId
  type: NUMERICAL
  -
  name: internalOrderId
  type: NUMERICAL
  -
  name: internalTradeId
  type: NUMERICAL
  -
  name: currency
  type: STRING
  -
  name: flags
  type: STRING
```

610 {
```
maxResult: 5000000
cacheResult: true
dataSourceName: miqds
cacheTimeToLive: 86400000
```

```
title: Account
query: "select distinct code as account from rdm.tradingaccount
        where lower(code) like lower(concat(:search,'%'))"

parameters:
  search:
    name: search
    dataType: STRING
    mandatory: true outputColumns:
  -
    name: account
    type: STRING maxResult: 10
cacheResult: true
paginationKey: account
dataSourceName: miqds
cacheTimeToLive: 86400000
```

1/3
```
{
"jobName":"ExampleJob",
"extractName":"transactionalview-201902",
"metadata":"",
"parameters":[
  {
  "name":"jobName",
  "value":"ExampleJob",
  "dynamic":true,
  "mandatory":true
  },
  {
  "name":"maxResults",
  "value":"25000000",
  "dynamic":true,
  "mandatory":true
  },
  {
  "name":"exchange",
  "dynamic":true,
  "mandatory":true
  },
  {
  "name":"security",
  "dynamic":true,
  "mandatory":true
  },
  {
  "name":"account",
  "dynamic":true,
  "mandatory":true
  },
  {
  "name":"trader",
  "dynamic":true,
  "mandatory":true
  },
  {
  "name":"houseCode",
  "dynamic":true,
  "mandatory":true
  },
  {
  "name":"transactionType",
  "dynamic":true,
  "mandatory":true
  },
  {
  "name":"orderDirection",
  "dynamic":true,
  "mandatory":true
  },
```

2/3
```
  {
  "name":"orderId",
  "dynamic":true,
  "mandatory":true
  },
  {
  "name":"tradeId",
  "dynamic":true,
  "mandatory":true
  },
  {
  "name":"value_from",
  "value":null,
  "dynamic":true,
  "mandatory":true
  },
  {
  "name":"value_to",
  "value":null,
  "dynamic":true,
  "mandatory":true
  },
  {
  "name":"volume_from",
  "value":null,
  "dynamic":true,
  "mandatory":true
  },
  {
  "name":"volume_to",
  "value":null,
  "dynamic":true,
  "mandatory":true
  },
  {
  "name":"price_from",
  "value":null,
  "dynamic":true,
  "mandatory":true
  },
  {
  "name":"price_to",
  "value":null,
  "dynamic":true,
  "mandatory":true
  },
```

3/3
```
  {
  "name":"date_from",
  "value":"2018-09-03",
  "dynamic":true,
  "mandatory":true
  },
  {
  "name":"date_to",
  "value":"2018-09-03",
  "dynamic":true,
  "mandatory":true
  }
],
"published":true
}
```

```
{
"jobName":"MyNewAPIEndpoint",
"extractName":"account-1",
"parameters":[
    {
        "name":"search",
        "value":"AccountOne",
        "mandatory":true,
        "dynamic":true
    },
    {
        "name":"maxResults",
        "value":"1000000",
        "mandatory":true,
        "dynamic":true
    }
],
"created":"2020-09-10 10:31:48.396",
"published":false,
"metadata":""
}
```

Fig. 8B

```
Request URL: https://example.com/api/extract/query/external/create?maxResults=100&search=AccountOne
Request Method: POST
Body:
{"extractJobName":"MyNewAPIEndpoint"}
```

← → C ⚠ Not secure | websitename.com/webpage

NASDAQ

API

Data Profile: • Transactional

▽ Extract  <
↕ Transactional view
⁂ Aggregated view
◌ Alerts view
🗐 Reporting
☰ Query manager •
◊ API Endpoints
⏱ History
⚙ Settings
⚲ Admin  >

2. API Paramaters
Select required parameters and set the values.

API Endpoint Name ☆
Choose API Endpoint Name

☑ Rows Limit
☑ Date Range
✓ Market(s)
✓ Security
✓ Account
✓ Trader
✓ House Code
✓ Transaction Type
✓ Order Direction
✓ Order or Trade Id
   Value Range
   Volume Range
☑ Price Range 👆

| Rows Limit ☆ ✏ | Date Range ☆ ✏ | | Security ☆ ✏ |
|---|---|---|---|
| Choose Rows Limit | Start Date  End Date 🗓 | Market(s) ☆ ✏ | Choose Security |
| Account ★ ✏ | Trader ☆ ✏ | Choose Market(s) | Transaction Type ☆ ✏ |
| Choose Account | Choose Trader | House Code ☆ ✏ | Choose Transaction Type |
| Order Direction ★ ✏ | Order or Trade Id ★ ✏ | Choose Market(s) | Max Price Range ☆ ✏ |
| Choose Order Direction | Choose Order or Trade Id | Min Price Range ☆ ✏ | Choose Max Price Range |
| | | Choose Min Price Range | |

• Test   ✕

@ Member Name
Sign out

Fig. 10C

DATA EXTRACTION WITH USER-CONFIGURABLE EXTRACT TEMPLATES

CROSS REFERENCE(S) TO RELATED APPLICATION(S)

This application is related to the following applications, filed on even date herewith: U.S. design patent application Ser. No. 29/763,996; and U.S. design patent application Ser. No. 29/763,997.

TECHNICAL OVERVIEW

The technology described herein relates to database access, and more particularly to data extraction using pre-defined extract templates.

BACKGROUND

With massive data stores becoming more and more common, and more and more extensive in content coverage, techniques for more efficiently accessing such data stores become increasingly important. Big data databases may have one or more tables each having thousands or millions of rows, each row having dozens, hundreds or even thousands of fields (data attributes). The tables may be updated on any interval, and in some instances may be updated in real-time or near real-time with changes occurring in a production system.

Users need a high level of knowledge and competence in querying techniques in order to efficiently extract relevant information from large databases having a large number of data attributes. Certain techniques, such as, storing queries that are created by experts for running by users are often used to assist users in accessing large databases.

As the data stored in databases gets more and more varied and voluminous, and as the needs for accessing that data becomes more demanding, improved techniques and systems continue to be desired.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to systems and techniques for making it more efficient and effective for users to access databases such as, but not limited to, big data databases. Described systems and techniques provide for efficient and easy-to-use user-customizable extract template for running queries against databases. The user-customizable extract template enable customization of the same predefined query according to the requirements and privileges of respective users. In particular, embodiments enable customization of queries by users themselves, reducing or altogether eliminating having developers to modify the query or associated extract templates while still allowing the data owners or administrators to control access to the data.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 6A-FIG. 6D (collectively FIG. 6) illustrate an example extract template that can be used according to some example embodiments;

FIG. 7 illustrates another example extract template that can be used according to some example embodiments;

FIG. 8A and FIG. 8B (collectively FIG. 8) illustrate example JSON objects specifying an extract job transmitted from a client device to the server system, according to some example embodiments;

FIG. 9 illustrates an example input data to run a query, according to some example embodiments;

FIGS. 10A-10D (collectively FIG. 10) illustrates example user interfaces in accordance with an embodiment.

DETAILED DESCRIPTION

Figure 1:
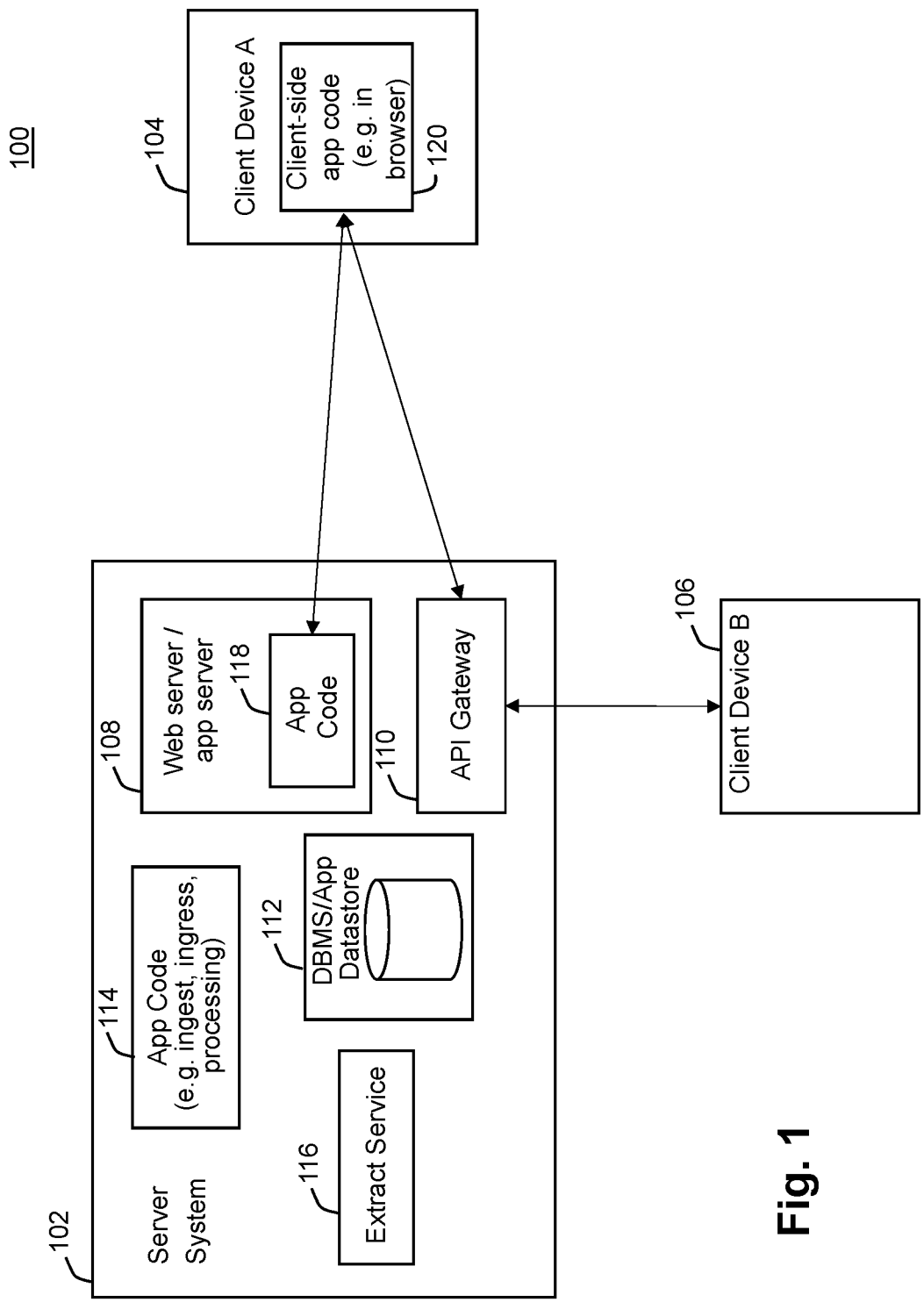
FIG. 1 illustrates an example computing environment in which user-customization of extract templates are provided for accessing data in a database in order to improve the efficiency and flexibility of data access, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, improving the performance of a database system by increasing the efficiency and flexibility of access to the data. As noted in the background section above, efficiently and effectively accessing data in big databases can be challenging. The technology described in this application, provides for user-customizable extract template that enable users themselves to customize stored predefined queries and to publish access to such customizations so that other users and/or systems can access the customized queries.

The inventors propose methods and systems in which certain users are enabled to customize predefined extract template and to publish application programming interface endpoints (API endpoints) providing certain other users with access to querying capabilities utilizing the customized extract templates. Once an extract template has been customized, it is referred to as an "extract job template". In some embodiments, the methods and systems enable the user performing the customization to control characteristics of respective attributes, such as, for example, requiring an attribute to be mandatory and/or dynamic, so that the access to data can be controlled at a more granular level. When an attribute is configured as mandatory, the user running the query is required to provide a value for that attribute; when an attribute is configured as not dynamic, the value for that parameter must be a value specified for that parameter in the extract job template.

In certain example embodiments, a user who is a business data owner for certain data can reconfigure an extract template previously created by a developer or administrator. The reconfigured extract template can be saved as an extract job template, and may specify a subset of the input parameters that can be configured by end users (or, users/clients of the business data owner) for the query defined in the extract template. The business data owner can provide respective end users with access to selected parts of the data by providing them with API access points through which the end users can run the extract job with parameter values supplied by them, without having to create a new query for each end user.

Figure 2:
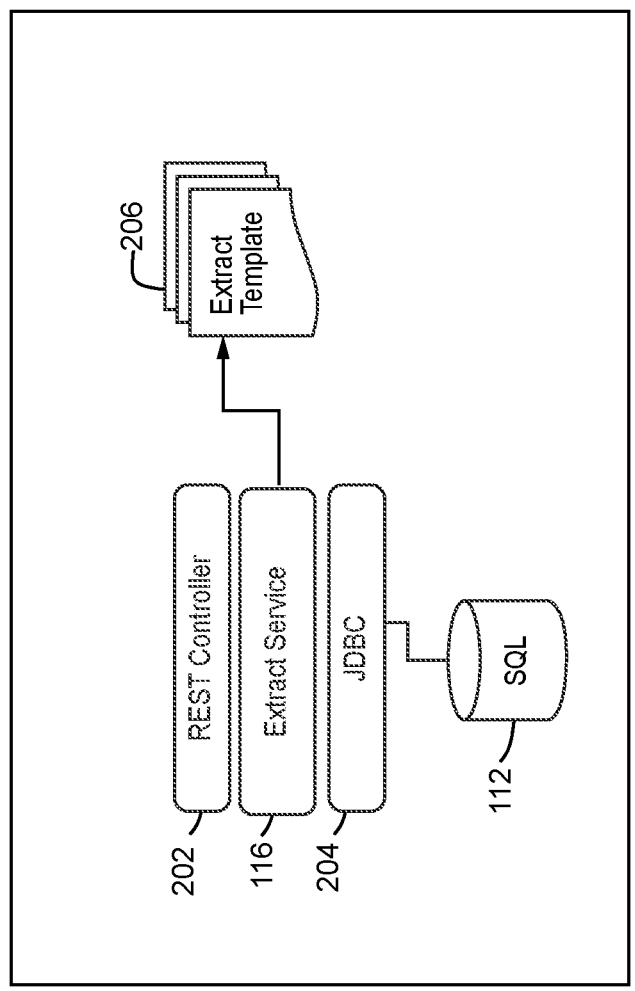
FIG. 2 illustrates the layered organization of an extract service provided in a server of the computing environment of FIG. 1, according to some example embodiments.
Figure 3:
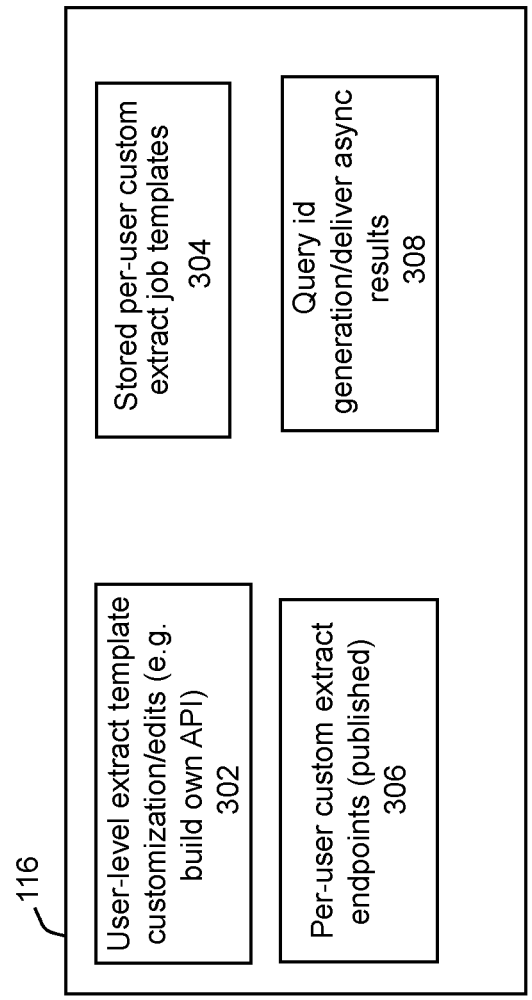
FIG. 3 schematically illustrates example components of the extract service of FIG. 2, according to some example embodiments.
Figure 4:
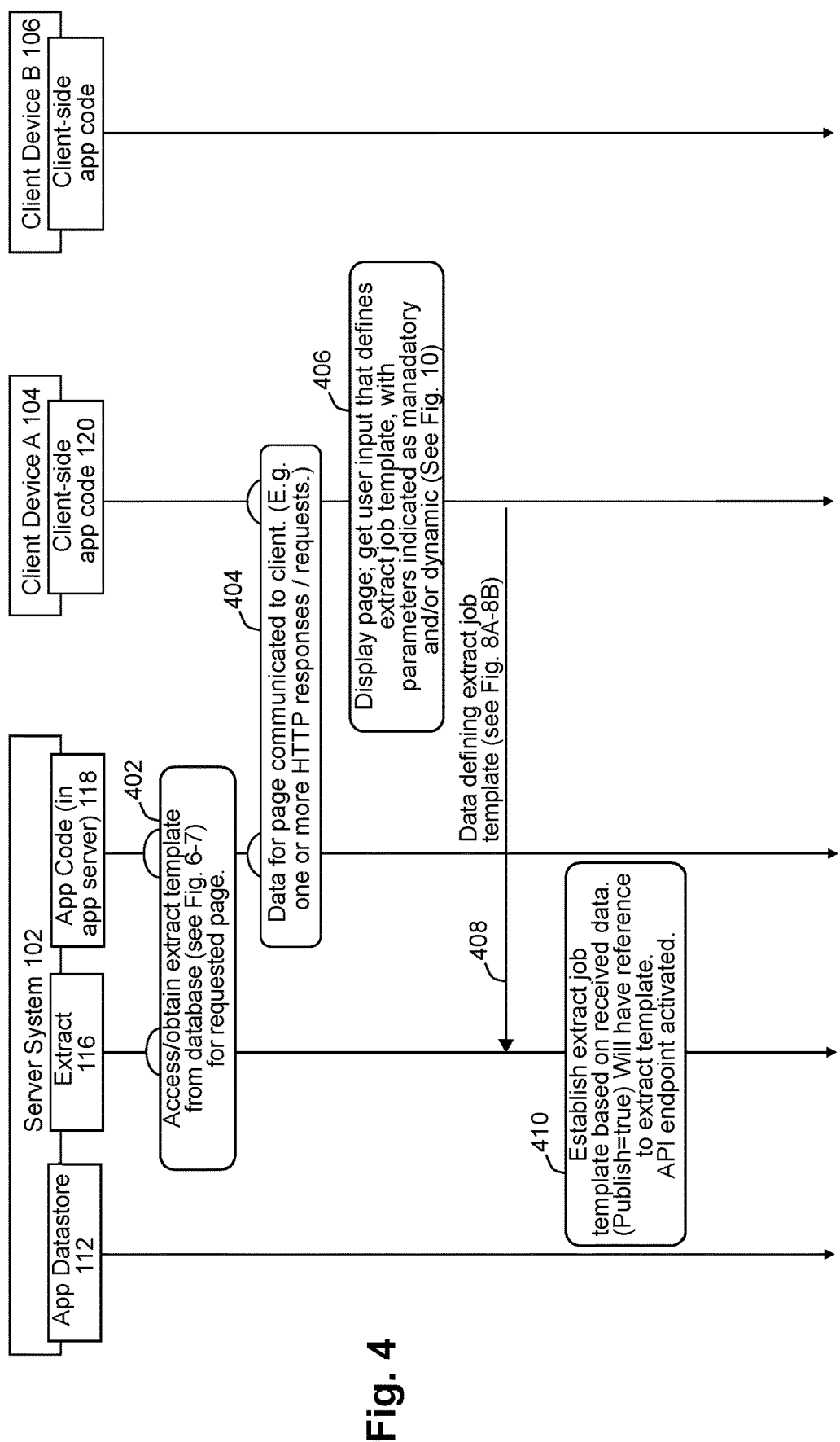
FIG. 4 illustrates an example flow diagram showing a sequence of interactions between the client devices and the server system of the computing environment of FIG. 1 for establishing an extract job, according to some example embodiments.
Figure 5:
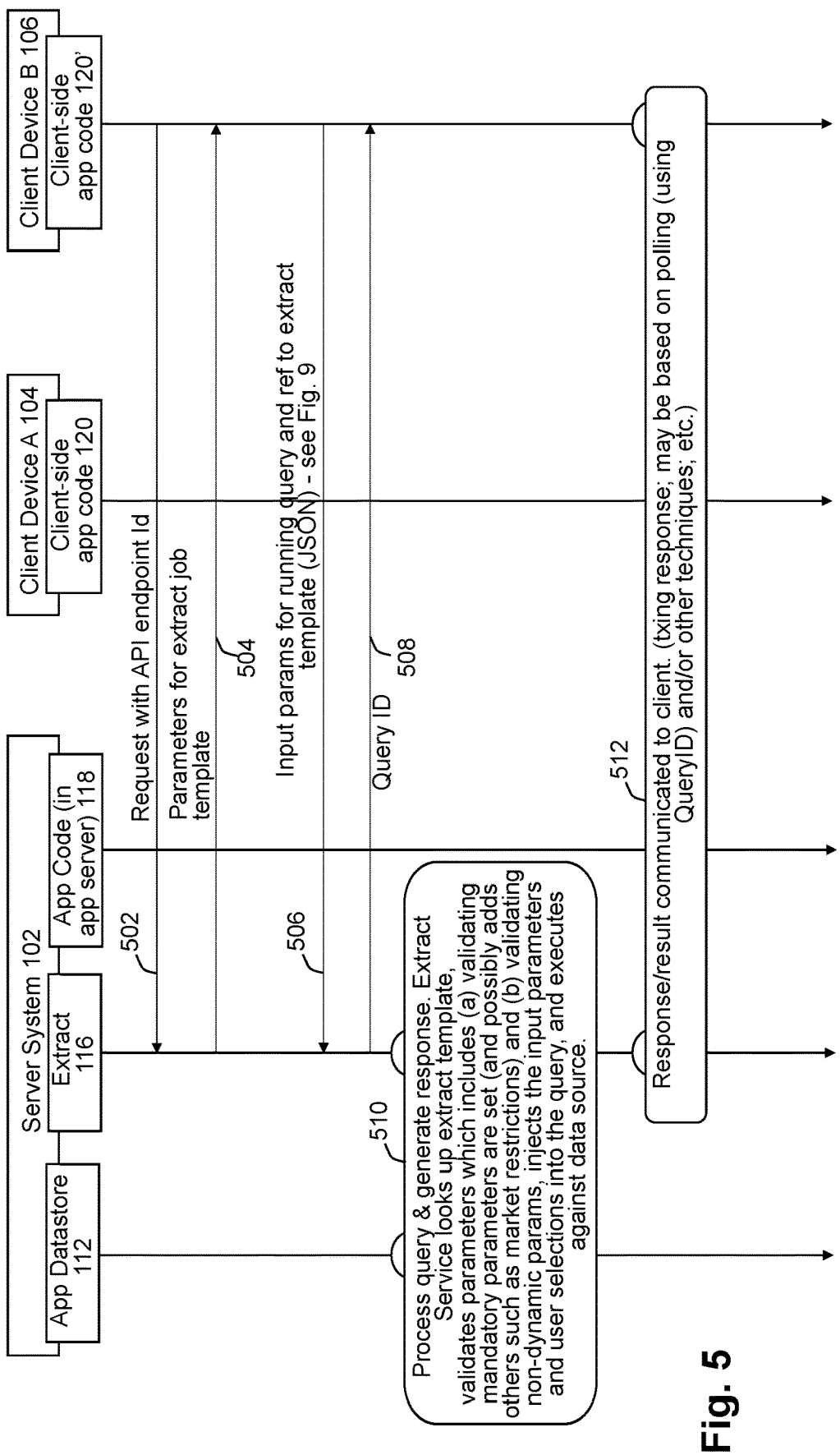
FIG. 5 illustrates an example flow diagram showing a sequence of interactions between the client devices and the server system of the computing environment of FIG. 1 for performing a query using the extract job established according to the flow diagram of FIG. 4, according to some example embodiments.
Figure 10A:
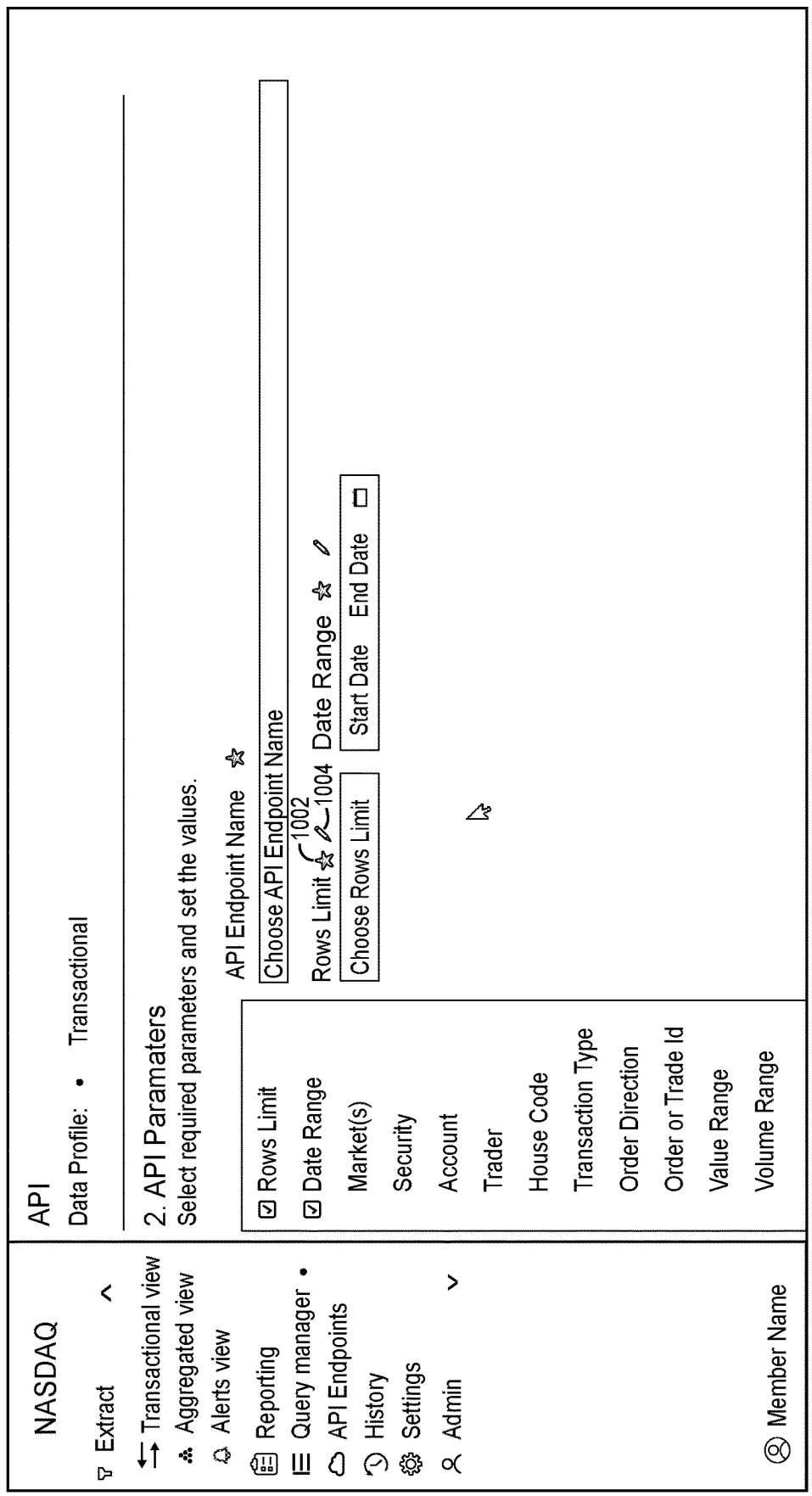
Figure 10B:
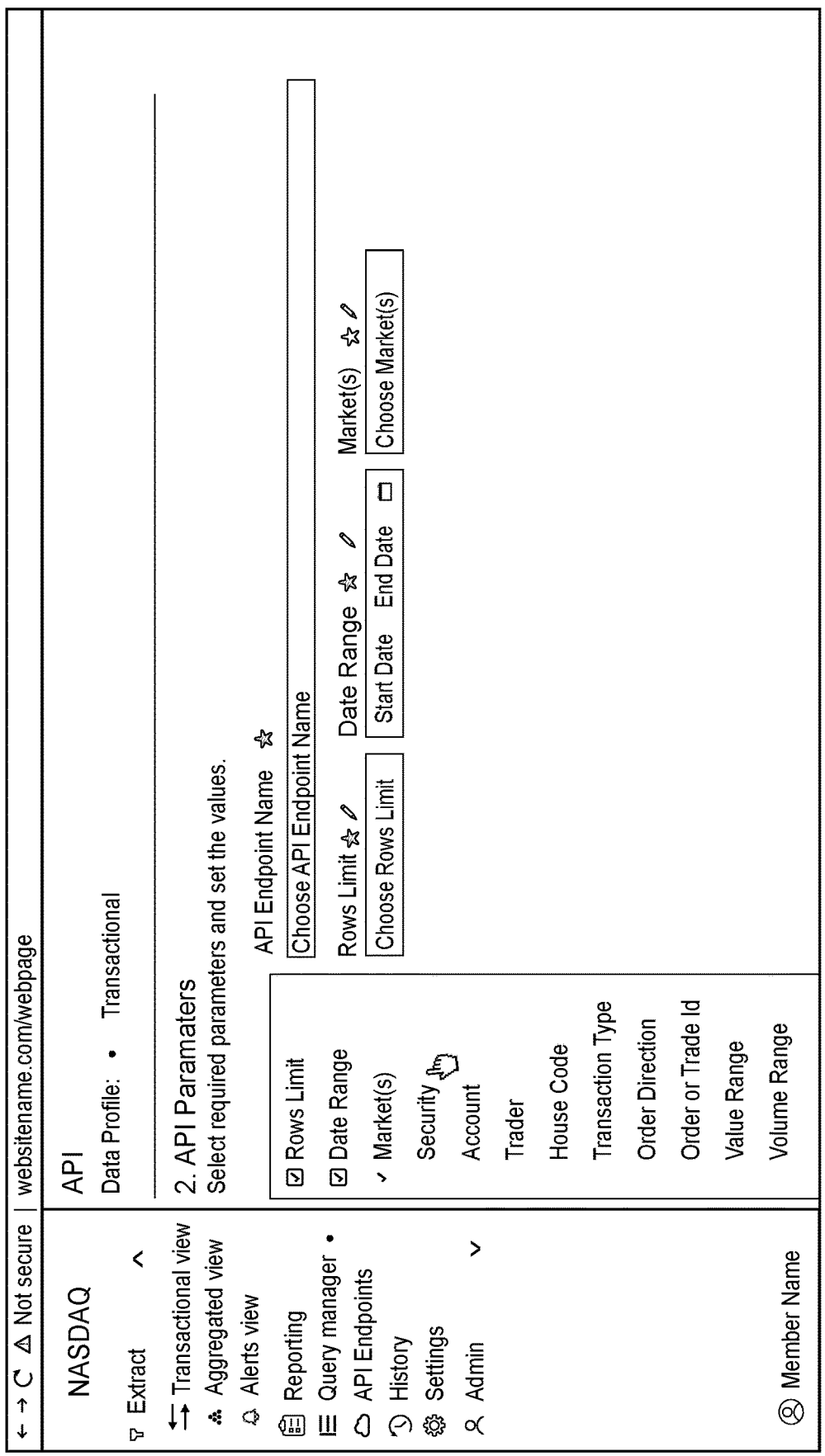
Figure 10D:
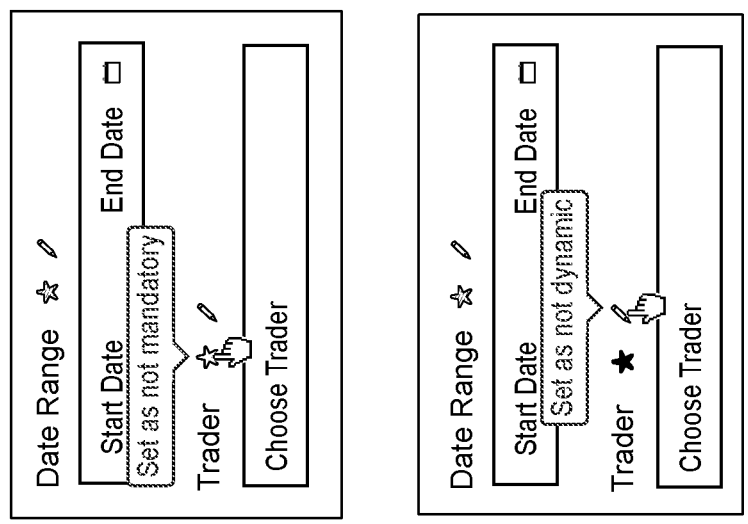
Figure 11:
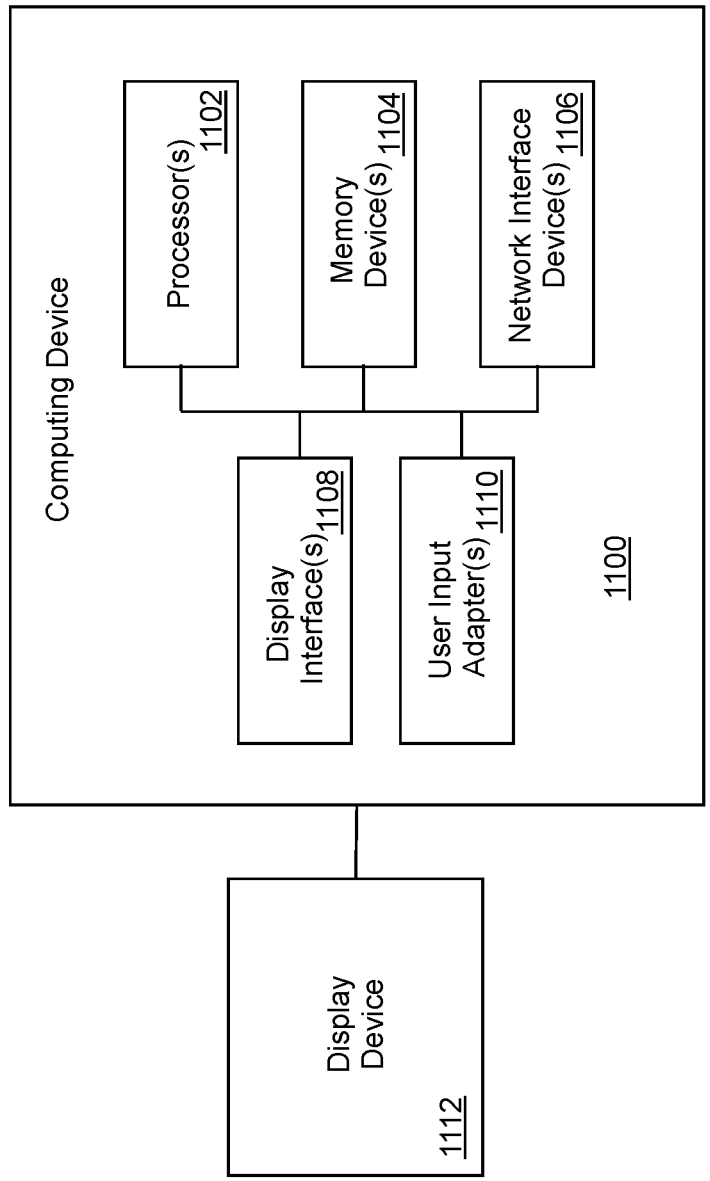
FIG. 11 schematically illustrates a computer that can be used to implement the user-customizable extract template and the use thereof, according to some example embodiments.

FIG. 1 illustrates an example computing environment in which user-customization of extract templates are provided for accessing data in a database in order to improve the efficiency and flexibility of data access, according to some example embodiments. The extract service shown in the server system in FIG. 1 provides the capability of user-customized extract templates and the use thereof. FIG. 2 illustrates the layered organization of the extract service provided in the server system of the computing environment of FIG. 1, according to some example embodiments. FIG. 3 schematically illustrates example components of the extract service of FIG. 1 and FIG. 2, according to some example embodiments. FIG. 4 illustrates an example flow diagram showing a sequence of interactions between one or more client devices and the server system of the computing environment of FIG. 1 for establishing an extract job associated with an extract template shown in FIG. 2, according to some example embodiments. FIG. 5 illustrates an example flow diagram showing a sequence of interactions between the client devices and the server system of the computing environment of FIG. 1 for performing a query using the extract job established according to the flow diagram of FIG. 4, according to some example embodiments. FIGS. 6A-6D and FIG. 7 illustrate example extract templates that can be used according to some example embodiments. FIG. 8A and FIG. 8B illustrate example JSON objects transmitted from a client device to the server system specifying extract jobs, according to some example embodiments. FIG. 9 illustrates an example input data to run a query using an extract job template, according to some example embodiments. FIG. 10 (FIGS. 10A-10D) illustrates example user interfaces that can be used for generating extract jobs in accordance with an embodiment. FIG. 11 schematically illustrates an example computing device that can be used, according to some embodiments, to implement the features described with reference to FIG. 1 through FIG. 10.

The embodiments described in detail in this application relate to electronic trading and/or securities analysis. However, although such applications may use the teachings in this disclosure with particular advantage to speed up access to data, to improve the flexibility of accessing data, and to improve the breadth and quality of data provided to users, embodiments are not limited to such environments or applications.

Description of FIG. 1

FIG. 1 illustrates a computing environment in accordance with certain example embodiments. The non-limiting computing environment 100 includes an electronic data access system which provides for user-customizable extract templates for accessing databases. The computing environment 100 may, for example, provide users with access to databases of securities and/or financial instrument information which may be operated in connection with an electronic trading system. In some embodiments, computing environment 100 provides users with a big data environment in which they can access securities/financial information from multiple markets and perform data discovery and/or other analysis on the data.

The electronic data access system includes a server system 102 and one or more client systems 104 and 106 that connect to the server system 102 over network connections. The server system 102 may include one or more computing devices, one or more storage devices, and network infrastructure to interconnect devices within the server system 102 and/or to enable connection between the server system 102 and external systems such as, but not limited to, client systems (e.g., client devices 104 and 106). The client devices 104 and 106 may connect to the server system via local area network or wide area network.

Server system 102 may include one or more interconnected servers serving an organization. The one or more servers may service user requests received from client systems, such as client device 104 and 106. The one or more servers may host a web application in a web server 108. In this description, the term web server is used to refer to either one of, or the combination of, a web server which handles HTTP requests and an application server which serves business/application logic to the web application. The web application may, for example, be a securities and/or financial instrument analysis application. In some embodiments, the analysis application may operate in association with an electronic trading application. The web application's code 114 may be stored in a memory device in the server system, and may include code for functions such as, for example, ingesting, ingressing and the like of data in addition to the processing logic of the web application.

The web application on the server system 102 may include a server-side portion 118 being executed by the web server 108, and may also have a client-side portion 120 executing on a client device 104. Client-side components of an application may operate to provide for handling the user interface by performing presenting (e.g., displaying) of information on a user interface device; receiving user input, etc. In some embodiments, the client-side components of an application may provide for generating, or receiving from a script or other application program, input values to be provided to the server-side component of the application. Server-side components may provide for authentication, service metering, generating or obtaining information to be presented to the user in accordance with received user inputs. The client-side portion 120 of the web application may, for example, execute within a browser (not shown separately) in the client device 104. In some embodiments, however, a client application that is not within a browser may access the web application on the server system 102.

The server system 102 also includes a database management system (DBMS) 112. In some embodiments, the DBMS may be part of the web application, or in some embodiments the DBMS may be a service that interfaces with the web application. The DBMS 112 includes one or more databases, and may store and provide access to securities and/or financial instrument information. In some embodiments, the stored securities and/or financial instrument information is based on, or derived from, a securities trading application running in, or externally on another server system connected to, the server system 102. The data in the one or more databases may be updated periodically at regular or random intervals or in real-time in association with the securities trading application. In the illustrated environment, the data in the one or more databases may be accessed by the server-side portion 118 of the web application.

The DBMS 112 includes a data extract service module 116. The data extract module 116 may be implemented as a microservice that interfaces between the web application and the data in the DBMS 112 in order to provide the web application with access to the data. The extract service provides the capability for users to run queries against the one or more databases of DBMS 112. In example embodiments, in contrast to conventional systems, the data extract module 116 provides improved capabilities of customization of extract data templates by users. As described in more detail below, extract data templates enable developers or database administrators to predefine a query to access one or more databases and provide users a template by which to run the predefined query against the one or more databases. FIG. 6 and FIG. 7 illustrate some example extract templates.

Server system 102 may also include an application programming interface gateway (API gateway) 110. The API gateway 110 serves as the entry point for client devices to use one or more access application programming interfaces (APIs) provided with the web application, DBMS 112 and/or any of the associated services (e.g. microservices that are part of the web application and/or the DBMS). For example, any request from either client device to access one or more APIs defined in the server system 102 to access databases in DBMS 112 via extract service module 116 will first be received by the API gateway 110. The API gateway may additionally perform, or coordinate, functions such as authentication of users and user requests, enforcing access and security constraints, and the like for user requests.

Client devices 104 and 106 may include any of personal computers, mobile computers, tablets, smartphones, and other electronic devices. In some example embodiments, any electronic computing device including at least a display, an input device for user input, and a communication interface for communicating with the server device may operate as a client device. In some embodiments, some client devices (e.g., client device 104) may have capabilities to, in addition to or alternative to access via API gateway 110, access the web application without going through the API gateway 110, whereas some client devices (e.g. client device 106) may be restricted to accessing the web application and/or the one or more databases only via the API gateway 110.

One or more servers in server system 102 may be configured for backend services. The backend services includes, for example, authentication, user configurations, security, credentials etc. The backend services may also provide for user and/or application session maintenance and the like.

In some embodiments, the server system 102, utilizing backend services, may also interact with one or more external servers, such as, for example, for receiving streamed or downloaded securities and/or trading information. Server system 102 may include one or more physical server computers that are communicatively connected to each other over a network and/or point-to-point connections. The physical server computers may be geographically co-located or distributed. The interconnection between servers in server system 102 may be via the Internet or over some other network such as a local area network, a wide area network or point-to-point connections (not separately shown) with each other. In some embodiments, multiple servers are interconnected with high speed point-to-point connections and/or a high speed broadcast bus. Each physical server in the server system 102 includes a processing system having at least one uni- or multi-core processor and includes system software. In some embodiments, each physical server may correspond to a processing unit in a Symmetric Multiprocessor (SMP). In some embodiments, each physical server may be standalone computer interconnected to one or more other computers with a high speed connection. In some embodiments, a server corresponds to a server process running on one or more physical computers.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware elements (such as a processor and a memory device) according to the instructions and data that comprise the software module. Further details regarding example hardware components that may be used to implement the features described herein are provided below with reference to FIG. 11, as well as elsewhere in this document.

Description of FIG. 2

FIG. 2 illustrates the layered organization of the extract service 116 provided in the server system 102 of the computing environment of FIG. 1, according to some example embodiments.

The extract service 116, as described above, provides the web application 118 and/or other web applications on server system 102 with access to data in the one or more databases of DMBS 112. As shown in FIG. 2, the extract service 116 may be implemented as a microservice layer between a REST controller 202 (e.g. an API which uses representational state transfer, also known as RESTful API), for interaction with the web application and/or related APIs, and JDBC (Java Database Connectivity) 204, for querying and retrieving the data.

The extract service 116 may include, or may access, one or more stored extract templates 206. Each extract template is predefined typically by a developer or a database administrator who has a high level of access authorization to access data in the one or more databases. An extract template specifies a query (e.g. an SQL query), and parameters to control the input to, and/or output from, the query. One or more input parameters may be specified by which the user of the extract template is permitted to specify input values to one or more input to the query. One or more output parameters may be specified by which the user of the extract template can configure the output that is displayed. The output columns may corresponding to data attributes (e.g. fields in database table) and/or values derived from data attributes. Optionally, one or more other parameters may also be specified for purposes such as limiting the number of rows to be searched and/or retrieved etc. Example extract templates are shown in FIG. 6 (FIGS. 6A and 6B).

The REST controller 202 provides services allowing the requesting systems (e.g., client devices 104 and 106) to access and manipulate textual representations of web resources by using a uniform and predefined set of stateless operations. Requests made to a resource's URI will generate a response with a body in HTML, XML, JSON, or another format. When HTTP is used, the operations (HTTP methods) such as POST can be used to initiate an extract job and operations such as GET can be used to retrieve results generated by an extract job's execution. In some embodiments, instead of the REST controller 202, another type of web service may be used to enable client devices to access data via the extract service.

The Java Database Connectivity (JDBC) layer 204 is a Java API providing connectivity to the databases of the DBMS 112. In some embodiments, the JDBC layer may be provided by the DBMS 112. In some embodiments, the layer 204 may implement some other protocol instead of Java to access the data in the one or more databases.
Description of FIG. 3

FIG. 3 schematically illustrates example components of the extract service 116 of FIG. 1 and FIG. 2, according to some example embodiments. The extract service 116 may include logic for enabling user-level extract template customization component 302, a stored per-user extract job templates 304, per-user extract job endpoints 306 and the logic for query ID generation and asynchronous result gathering 308.

The component 302 includes instructions for enabling user-level extract template customization. For example, this module provides the user interfaces, such as those shown in FIG. 10, by which a user can retrieve and modify one of the developer-created extract templates 206. The user interfaces may also provide for saving the modified extract templates as extract job templates. FIG. 6 shows examples of extract templates and FIG. 8 shows example extract job templates.

The component 304 is a collection of modified extract templates, referred to herein as extract job templates, saved using a user interface provided in component 302. Each extract job template is created by a user with a level of permissions (e.g. data access permissions) that may be the same or lower than the level of permissions of a developer or administrator. For convenience of reference, this description may use the term "business data owner" to refer to the user who has sufficient permissions to create the extract job template for a particular dataset. End users, which are users or clients of the business data owner, may require a level of permission lower than that of the business data owner to access and run the extract jobs published by the business data owner. Each saved extract job template is associated with the corresponding extract template, for example, by specifying the name of (or other identifier of) the extract template in the extract job template. In some embodiments, each extract job template specified the name of the corresponding extract template as a foreign key.

The component 306 is a collection of API endpoints that are published for accessing the extract job templates 304. A published API endpoint is available in component 306 for each extract job stored in component 304. As described in more detail in the following figures, the published API may be distributed to users or clients of the business data owner of the data accessed using a particular extract job template in order to enable those users to run the extract job template against the database. The API gateway may be configured to control access to extract jobs by external entities by controlling access to respective ones of the API endpoints in accordance with the published/unpublished status configured for each by the business data owner or other authorize user.

The component 308 includes instructions for generating a query id for a query, and to gather asynchronously received results for providing to the user. The extract service may generate a query id for the extract job being initiated, and return that query id to the client device that requests the running of the extract job. The client device uses the query id to periodically poll the server system and/or the extract service to retrieve the results generated by the query.
Description of FIG. 4

FIG. 4 illustrates an example flow diagram showing a sequence of interactions between the client devices and the server system of the computing environment of FIG. 1 for establishing an extract job, according to some example embodiments. The establishing of the extract job includes creation of the extract job template and, in some instances, the publishing of the corresponding API endpoint.

The sequence of interactions shown in FIG. 4 may begin when the web application starts up on the server system 102. When the server-side portion 118 of the web application starts up, in operation 402, the server-side portion 118 communicates with the extract service 116 to access the extract templates, such as, the extract templates 206.

As described above, each of the extract templates may be created by a developer or administrator, and specifies a query, one or more input parameters and one or more output parameters. Example extract templates are shown in FIG. 6.

Subsequently, in operation 404, the server system 102, or more specifically the server-side portion 118 of the web application, receives a request from a user on client device 104 to modify an extract template. The request may be an HTTP request from the client-side portion 120 of the web application running on client device 104. The request may identify the extract template sought to be modified or reconfigured.

All requests for accessing the extract service 116 are received at the API gateway 110, which authorizes the user (based on login information) and assigns a role to the user. In example embodiments, server system 102 may have previously configured roles for each user with certain levels of permissions being associated with each role. Thus, before allowing the requesting user to modify the extract template, the server system assigns a role to the requesting user and verifies that the requesting user and/or the role assigned to the requesting user has sufficient permissions to modify the extract template. According to an embodiment, with each extract job, at least three levels of roles and/or permissions are associated: a first level that is sufficient to edit the associated extract template; a second level that is insufficient to edit the extract template, but is sufficient to edit a corresponding extract job template; and a third level that is insufficient to edit either the extract template or the extract job template but is sufficient to access the extract job template to use it for running queries.

Before the user on the client device 104 is able to send the request in operation 404, the user logs in to the server system and/or web application (login is not shown in the figure). When the user logs in, a JWT token may be generated specifying the role assigned to the user, and in subsequent requests to the server system, the user may include the JWT token to be used in authentication.

The user of client device 104 may be a business data owner who has sufficient permissions in the server system 102 to create an extract job template from the identified extract template. The business data owner may desire to provide one or more of his/her clients with customized access to the data of the identified extract template, and initiate the request to the server system 102.

In response to the request, the server-side portion 118 returns the requested extract template to the client. In some embodiments, instead of a copy of the entire extract template, the data for the input parameters and optionally the output parameters defined in the requested extract template are returned. The data may be provided to the client device 104 with one or more HTTP responses. In some embodiments, the client device may send multiple HTTP requests to obtain the data.

In operation 406, the client device 104 displays a user interface based on the data received in operation 404. The user interface may display input fields for the input parameters and/or the output parameters specified in the extract template. Via the displayed user interface, user input is obtained for input parameters and/or output parameters. In some embodiments, one or more input parameters for which user-input is obtained may be indicated in the user interface as mandatory and/or dynamic. FIG. 10 shows example user interfaces for modifying an extract template to generate an extract job template.

The above mentioned business data owner may, by using a user interface such as that shown in FIG. 10, select a subset of the input parameters of the extract template for the extract job. By selecting a subset, the business data owner, restricts the access provided to his/her clients to the data, beyond what is restricted in the extract template. Moreover, by setting characteristics for respective ones of the input parameters, the business data owner is able to further control or restrict the amount and/or scope of the data accessed by his/her clients. For example, by setting a selected input parameter to have the characteristic of not "dynamic" and specifying a value, the client is restricted to access data that must include a match for the specified value in the non-dynamic parameter. By setting a selected input parameter to have the characteristic of "mandatory", the client is restricted to access data filtered to the specified value of the selected input parameter. Parameter requirement information such as, but not limited to, whether the parameter is a mandatory parameter, whether the parameter is a dynamic parameter, may be associated with some or all selected input parameters.

Thus, when an extract job is established and a parameter is set as "non-dynamic," then there will be a set of one or more values that will always be used as the input values for that parameter in the corresponding query. For example, (a) when the extract job is created, the "Exchange" field could set to be non-dynamic and have a value of {Nasdaq}, in which case all query results will have Exchange=Nasdaq. As another example, (b) when the extract job is created, the "Exchange" field could be set to be non-dynamic and have a value of {NYSE or Nasdaq}, in which case all query results will have Exchange=NYSE or Exchange=Nasdaq. In contrast, (c) if the "Exchange" field is dynamic, then incoming query requests (for example, at operation 506 described below) can submit any value for the "Exchange" field. When an extract job is established and a parameter is set as "mandatory," then for all incoming query requests (for example, at operation 506 described below) for that extract job, the query request must include a value for that parameter. If a query request does not include a value for that parameter, it will be rejected. In contrast, in some embodiments, the query request is not required to include a value for parameters that are set up as "non-dynamic" and the query is run (for example, at operation 510 described below) with the value specified in the extract job template for that parameter.

At operation 408, data defining an extract job based on the extract template is sent from the client device 104 to the extract service 116. The data defining the extract job comprises the input values obtained from the user for the input parameters. In some embodiments, the data defining the extract job may also include a subset of output parameters selected from the set of output parameters specified in the extract template. The data defining the extract job may also include a name for an API endpoint to be established for the extract job, and may further identify the associated extract template and whether the API endpoint is to be published. Example JSON objects specifying data defining the extract job, as returned from the client device to the server system, are shown in FIG. 8. The data defining the extract job as sent from the client device to the server is also referred to as configuration information.

At operation 410, the extract service 116 receives the data defining the extract job, and stores the received data. The extract job includes a reference to the corresponding extract template thereby linking the extract job to the associated extract template. In an embodiment, the data defining the extract job is received as a JSON object. Whereas JSON is the transportation format used by REST, it is mapped to a Java object when it reaches the extract service and stored as a JPA (Java Persistence API) entity representing the extract job. If the received data indicates that the extract job is to be published, an API endpoint is generated and activated. In an embodiment, the publishing and unpublishing of an API endpoint includes the API gateway enabling and disabling, respectively, that API endpoint to be accessed by external entities.

Although not shown in FIG. 4, the information regarding the stored extract job template and/or information regarding the published API endpoint is transmitted from the extract service to the client device 104. The user of the client device 104 may then, provide the API endpoint to one or more his/her clients to enable those clients to access the extract job associated with the API endpoint.

Description of FIG. 5

FIG. 5 illustrates an example flow diagram showing a sequence of interactions between the client devices and the server system of the computing environment of FIG. 1 for performing a query using the extract job established according to the flow diagram of FIG. 4, according to some example embodiments.

The sequence of operations of FIG. 5 may begin when, a user, for example, the user of client device 106, sends a request 502 including an identifier for the API endpoint provided by the business data owner to his/her clients as described above in relation to the sequence of operations in FIG. 4. For purposes of this example, the user of client device 106 may be considered a client of the business data owner user of client device 104.

As noted above, all requests for the extract service are received by the API gateway 110 which authenticates the requesting user and assigns a role to the requesting user. It then verifies that the requesting user and/or the role of the requesting user has adequate permissions to access the extract job before authorizing the requesting user to proceed. As described above with respect to the user of client device 104, the user of client device 106 is also required to log in to the server system before sending the request of operation 502. A JWT token specifying the assigned role is provided to the user at the time of login, and the user includes this token with each subsequent request to the server system to enable authentication.

In some embodiments, all requests pass through the API Gateway, which acts as a reverse proxy. The API Gateway passes the request on to underlying services, such as, in this case, the extract service 116. API gateway may also check whether the requested API endpoint is currently published, or is currently in an unpublished state.

In response to receiving the request, the extract service 116 accesses the extract job template corresponding to the received API endpoint and at operation 504 transmits information regarding the parameters and other information from the extract job template, to the requesting client device. In some embodiments, the client device 106 may display a user interface by which its user can provide input values to the input parameters specified in the extract job template; in other embodiments, the code running on client device 106 and that interacts with the extract service 116 as described in this FIG. 5 does not include a user interface.

At operation 506, input values for one or more input parameters for running a query and a reference (e.g., a unique identifier, a name) to the extract job are transmitted in a request message from the client device 106 (client-side portion 120' of the web application) to the extract service 116. In some embodiments, optionally, one or more input values may be received for one or more output parameters. The output parameters may be used to configure what output columns are output when the output of the query is provided to the requesting user. The input values may be obtained as inputs by the client device either from the user on the user interface displayed at operation 504, or from an application program (or script) running on the client device. In some embodiments, the one or more request messages may be HTTP request messages; an example HTTP request message is shown in FIG. 9. In some embodiments, at least the mandatory input parameters are required to be included in the header(s) of at least one of the one or more request messages.

At operation 508, the extract service 116 generates a query id for the query and transmits the query id to the requesting client device 106. The query id is a unique identifier that the server system can use to uniquely identify the query and/or results at least within a predetermined time interval after the query id is generated. The query id enables polling by the client device for obtaining results of the query and also subsequently obtaining the results.

At operation 510, the extract service 116 processes the query and generates the response. Processing the query includes looking up the extract template based, for example, on the reference to the extract job included in the request, and validating the input and/or output parameters specified in the request. Validating may include validating that all parameters indicated in the extract job template are set and validating non-dynamic parameters. In some embodiments, prior to processing the query, the extract service 116 may add one or more parameters. For example, the extract service 116 may, without specifically being requested by the user, include system-specified values for one or more attributes pertaining to market restrictions (e.g., restrict to data from the Amsterdam exchange, etc.). These may be performed in accordance with configured rules.

The performing of the extract job includes accessing the associated extract template and running the query specified in the extract template with the input parameters specified in the extract job. After validating the received parameters, the validated input parameters and user selections are injected into the query and executed against the one or more databases 112. The injecting may include accessing a template of the query as specified in the extract template, and replacing one or more parameters in the query with validated input parameters. For example, in some embodiments, after loading the query into memory and before executing the query, the memory locations for one or more input parameters of the query are populated with the validated input parameters. If any of the validations fail, the query is not run and a message to that effect is transmitted to the requesting user on client device 106.

At operation 512, the results of the extract job may be asynchronously returned to the client device based on polling by the client device. With each poll, the client device includes the query id received in response to requesting that the extract job is run. When the result is ready, the server system may respond to the poll indicating that the results are ready. The requesting client device then obtains the data of the result by sending one or more messages with the query id. At the client, the result data may be displayed to the user on the client device (or other device), may be stored, or may be provided to another application for analysis and/or display. In some embodiments, the results are, instead of being transmitted to the client device, either stored to a storage device and/or provided to another application for processing and/or analysis.

In some embodiments, where the extract job restricts the output columns (e.g. based on output user-specified values for output parameters or other restrictions) that are to be accessible to the requester (in this example, the client device 106), the server system may filter the results of the query to remove the output columns indicated in the extract job as not being provided to the requester.

Description of FIG. 6 and FIG. 7

FIG. 6 (FIG. 6A, FIG. 6B, FIG. 6C and FIG. 6D) and FIG. 7 example extract templates that can be used according to some example embodiments. An extract template, such as that shown in FIG. 6 or FIG. 7, could be accessed at operation 402 in FIG. 4.

In FIG. 6A-6D, the extract template 602 includes a title 603, a query 604, input parameters 606, output parameters 608 and other parameters 610. The title 603 is used by the server system to uniquely identify each extract template. As seen below, an extract job template includes the title of the associated extract template, thereby establishing a link to that extract template.

The extract template 602 provides only one input parameter 606 ("queryId"), corresponding to the only input parameter accepted by the query 604. In some embodiments, the input parameters specified in the extract template consists of either a subset of, or all of, the set of input parameters in the query specified in the extract template. In embodiments, the possible set of input parameters to be specified for a query in an extract template, includes all parameters in the query that is used in selecting and/or manipulating the data that is obtained as the result of the query. The query is formed to reference each possible input parameter by name. For example in FIG. 6B the ":search" annotation references an injection point for a input parameter called search: "select distinct code as account from rdm.tradingaccount where lower(code) like lower(concat(:search,'%'))". The query will be converted into a prepared statement into which the input parameters will be injected upon execution.

The output parameters 608 specify the output columns available to be displayed in the result, and their respective formats. In embodiments, the possible set of output parameters to be specified for a query in an extract template, includes all parameters (e.g. attributes or values derived from attributes) that are obtained as a result of running the query.

The other parameters 610 may, for example, restrict the maximum number of rows in the result (e.g. in order to ensure that unnecessarily large data sets are not retrieved), whether the result can be cached, a time to live for the cached result, data source, and the pagination/ordering of the result.

In each extract job that is associated with the extract template 602, a subset of, or all of, the input parameters specified in extract template 602 is specified as the permitted set of input parameters. In a similar manner, a subset of, or all of, the output parameters specified in extract template 602 is specified as the permitted set of output parameters. Each extract job template also identifies the associated extract template.

In FIG. 7, the example extract template 704 includes one input parameter ("search") and one output parameter ("account").

In some embodiments, the extract template additionally contains a reference to the data source in a variable name (e.g. variable name "dataSourceName"). The value in this field may be the Java Naming and Directory Interface (JNDI) name of the data source. This is a name that points directly or indirectly to the connection properties, enabling the same name to be used to point to different connection properties in test database, production database, etc.

Description of FIG. 8

FIG. 8 (FIG. 8A and FIG. 8B) illustrates example JSON objects specifying an extract jobs transmitted from a client device to the server system, according to some example embodiments. For example, one or more such JSON objects may be transmitted from the client device 104 to the server system at operation 408 shown in FIG. 4.

The JSON object 802 shown in FIG. 8A identifies its extract job as "ExampleJob", and corresponding extract template as "transactionalview-201902". It also specifies several input attributes and indicates whether each attribute is a dynamic attribute ("dynamic": true/false) and/or a mandatory attribute ("mandatory": true/false). The specified parameters also indicate, for some parameters, default values (e.g. "date to" value as "2018-09-03"). Additionally, the JSON object 802 indicates that the extract job is to be published ("published": true).

FIG. 8B shows another JSON object 804 sent from a client device to the extract service to set up an extract job in accordance with user input received at the client device. The JSON object 804 is an example object specifying that the extract job is not to be published ("published": false). The "metadata" field may be used in certain embodiments to exchange information between the user interface and the back end.

Description of FIG. 9

FIG. 9 illustrates an example input data to run a query, such as that which is received by the server system at operation 506 shown in FIG. 5, according to some example embodiments. More particularly, the extract job execution request 802 is an HTTP message for a POST operation. In the body of the request, a JSON object is specified identifying the extract job by name ("extractJobName": "MyNewAPIEndpoint"). The URL in the request includes the mandatory parameters (and corresponding user input values) required by the extract job. In the URL of the request 802, "maxResults=100&search=AccountOne" specifies, for each of the mandatory parameters "maxResults" and "search" required by the extract job (as shown in the JSON object 802 for the extract job "MyNewAPIEndpoint"), the corresponding values 100 and "AccountOne", respectively.

Note that whereas the extract template execution request 802 references the API endpoint name (e.g., "MyNewAPI-Endpoint"), the extract job template identified the extract template associated with the extract job (e.g., extract job template 802 identified the associated extract template as "account 1" ("extractName": "account—1")).

Description of FIG. 10

FIG. 10 (FIGS. 10A-10D) illustrates example user interfaces in accordance with an embodiment.

FIG. 10A illustrates a user interface for reconfiguring an extract template in order to generate an associated extract job template. The leftmost column in the user interface indicates that three extract templates ("Transactional view", "Aggregated view" and "Alerts view") are available. On the main area of the user interface, editing of the "Transactional view" extract template is shown with two input parameters ("Rows Limit" and "Date Range") being selected. Input fields are provided for the user to input values for the selected input parameters. Each selected input parameter is user-configurable with respect to whether it is a mandatory parameter and/or a dynamic parameter.

In addition, the user is also requested to input a name for the API endpoint associated with the extract job template.

The user interface shown in FIG. 10A may be displayed on the client device 104, when the client device, or the user of the client device, requests to create a new extract job template by reconfiguring or editing an extraction template as described. For example, the user interface of FIG. 10A may be displayed on the client device at operation 406 in FIG. 4. A similar user interface may also be available for reconfiguring or modifying an already created extract job template.

The extract template may specify, as is the case here with the "Rows Limit" and "Date Range" shown in FIG. 10A, that one or more of the input parameters must be specified. In the illustrated user interface, in the selection column for parameters, "Rows Limit" and "Date Range" selected and grayed out indicating that the user is not permitted to deselect these parameters. These parameters are further indicated as being mandatory and non-dynamic as indicated by icons 1002 and 1004 respectively. By defining these two parameters as mandatory and non-dynamic, the query will be run with the values specified in the extract job definition for these two parameters and the user is not required to specify values for these two parameters in the query request.

FIG. 10B illustrates the user interface shown in FIG. 10A after an additional parameter ("Markets") is selected by checking the checkbox in the selection column. In response to the check box being checked, the corresponding input field is provided in the main area of the user interface. As shown in the figure, the "Market(s)" input parameter is specified as not mandatory and non-dynamic.

FIG. 10C illustrates the user interface after several more input parameters are selected. Several of the selected input parameters are configured to be mandatory and dynamic.

FIG. 10D illustrates examples of the mandatory status and the dynamic status are indicated for some example input parameters. 1006 shows the input parameter "Trader" being configured as both mandatory and dynamic. 1008 shows the same input parameter configured as not mandatory and not dynamic. As can be seen, icons 1002 and 1004 in FIG. 10D are displayed in a first color or pattern indicating that the corresponding current configurations are mandatory and dynamic, and in a second color or pattern indicating the current configurations are not mandatory and not dynamic. For each icon, toggling of the two characteristic states can be effected by selecting/clicking on the icon. In some embodiments, hovering over icons 1002 and 1004 may cause a pop us indicating the setting that would occur if the icon is selected.

In some embodiments, further user interface features provide for the user who is modifying an extract template to create an extract job to save the created extract job, publish an extract job, unpublish an extract job, run the extract job and display the results in the user interface, select/deselect output columns in the displayed result, etc.

Description of FIG. 11

FIG. 11 schematically illustrates a computer that can be used to implement the user-customizable extract templates and the use thereof, according to some example embodiments. In particular, the computing device 1100 can be used to implement the servers in the server system and/or client devices of FIG. 1 and to run the process of FIG. 4-5, according to some example embodiments. FIG. 11 is a block diagram of an example computing device 1100 (which may also be referred to, for example, as a "computing device," "computer system," or "computing system") according to some embodiments. In some embodiments, the computing device 1100 includes one or more of the following: one or more processors 1102; one or more memory devices 1104; one or more network interface devices 1106; one or more display interfaces 1108; and one or more user input adapters 1110. Additionally, in some embodiments, the computing device 1100 is connected to or includes a display device 1112. As will explained below, these elements (e.g., the processors 1102, memory devices 1104, network interface devices 1106, display interfaces 1108, user input adapters 1110, display device 1112) are hardware devices (for example, electronic circuits or combinations of circuits) that are configured to perform various different functions for the computing device 1100.

In some embodiments, each or any of the processors 1102 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1102 uses an instruction set architecture such as x86 or Advanced RISC Machine (ARM).

In some embodiments, each or any of the memory devices 1104 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1102). 1104

In some embodiments, each or any of the network interface devices 1106 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1108 is or includes one or more circuits that receive data from the processors 1102, generate (e.g., via a discrete GPU, an integrated GPU, a CPU executing graphical processing, or the like) corresponding image data based on the received data, and/or output (e.g., a High-Template Multimedia Interface (HDMI), a DisplayPort Interface, a Video Graphics Array (VGA) interface, a Digital Video Interface (DVI), or the like), the generated image data to the display device 1112, which displays the image data. Alternatively or additionally, in some embodiments, each or any of the display interfaces 1108 is or includes, for example, a video card, video adapter, or graphics processing unit (GPU).

In some embodiments, each or any of the user input adapters 1110 is or includes one or more circuits that receive and process user input data from one or more user input devices (not shown in FIG. 10) that are included in, attached to, or otherwise in communication with the computing device 1100, and that output data based on the received input data to the processors 1102. Alternatively or additionally, in some embodiments each or any of the user input adapters 1110 is or includes, for example, a PS/2 interface, a USB interface, a touchscreen controller, or the like; and/or the user input adapters 1110 facilitates input from user input devices (not shown in FIG. 10) such as, for example, a keyboard, mouse, trackpad, touchscreen, etc.

In some embodiments, the display device 1112 may be a Liquid Crystal Display (LCD) display, Light Emitting Diode (LED) display, or other type of display device. In embodiments where the display device 1112 is a component of the computing device 1100 (e.g., the computing device and the display device are included in a unified housing), the display device 1112 may be a touchscreen display or non-touchscreen display. In embodiments where the display device 1112 is connected to the computing device 1100 (e.g., is external to the computing device 1100 and communicates with the computing device 1100 via a wire and/or via wireless communication technology), the display device 1112 is, for example, an external monitor, projector, television, display screen, etc.

In various embodiments, the computing device 1100 includes one, or two, or three, four, or more of each or any of the above-mentioned elements (e.g., the processors 1102, memory devices 1104, network interface devices 1106, display interfaces 1108, and user input adapters 1110). Alternatively or additionally, in some embodiments, the computing device 1100 includes one or more of: a processing system that includes the processors 1102; a memory or storage system that includes the memory devices 1104; and a network interface system that includes the network interface devices 1106.

The computing device 1100 may be arranged, in various embodiments, in many different ways. As just one example, the computing device 1100 may be arranged such that the processors 1102 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1100 may be arranged such that: the processors 1102 include two, three, four, five, or more multi-core processors; the network interface devices 1106 include a first network interface device that implements Ethernet and a second network interface device that implements WiFi and/or Bluetooth; and the memory devices 1104 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the server system 102, client applications 120, web application 118, DBMS 110, etc., each of which will be referred to individually for clarity as a "component" for the remainder of this paragraph, are implemented using an example of the computing device 1100 of FIG. 11. In such embodiments, the following applies for each component: (a) the elements of the computing device 1100 shown in FIG. 10 (i.e., the one or more processors 1102, one or more memory devices 1104, one or more network interface devices 1106, one or more display interfaces 1108, and one or more user input adapters 1110), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1104 (e.g., in various embodiments, in a volatile memory device such as a RAM or an instruction register and/or in a non-volatile memory device such as a flash memory or hard disk) and all actions described herein as performed by the software modules are performed by the processors 1102 in conjunction with, as appropriate, the other elements in and/or connected to the computing device 1100 (i.e., the network interface devices 1106, display interfaces 1108, user input adapters 1110, and/or display device 1112); (c) alternatively or additionally, to the extent it is described herein that the component processes and/or otherwise handles data, in some embodiments, such data is stored in the memory devices 1104 (e.g., in some embodiments, in a volatile memory device such as a RAM and/or in a non-volatile memory device such as a flash memory or hard disk) and/or is processed/handled by the processors 1102 in conjunction, as appropriate, the other elements in and/or connected to the computing device 1100 (i.e., the network interface devices 1106, display interfaces 1108, user input adapters 1110, and/or display device 1112); (d) alternatively or additionally, in some embodiments, the memory devices 1102 store instructions that, when executed by the processors 1102, cause the processors 1102 to perform, in conjunction with, as appropriate, the other elements in and/or connected to the computing device 1100 (i.e., the memory devices 1104, network interface devices 1106, display interfaces 1108, user input adapters 1110, and/or display device 1112), each or any combination of actions described herein as performed by the component and/or by any software modules described herein as included within the component.

The hardware configurations shown in FIG. 11 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 10, (e) via other hardware arrangements, architectures, and configurations, and/or via combinations of the technology described in (a) through (e).

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Technical Advantages of Described Subject Matter

Certain example embodiments provide improved user configuration capabilities in relation to extract templates for accessing data in databases. In particular, by enabling some categories of users (such as, business data owners described above) to customize extract templates without the intervention of a developer or administrator, embodiments vastly improve the ability of some users to utilize the data in the databases.

The customized extract templates, referred to as extract job templates above, provide greater flexibility of data access, and thereby improve the utilization of the databases by enabling more users to access more of the data. The extract job templates also enable users to more granularly customize the same query on a per client basis, so that the data received for each client can be limited to the data of actual interest to that client thereby improving the efficiency of data access and overall system performance by reducing the amount of unnecessary data being received.

Additionally to the capability to define customized extract jobs from an extract template, the capability provided in the user interface to individually specify whether each input parameter to a query is mandatory and/or non-dynamic provides a novel capability to users.

The example embodiments described above concerned an electronic data access system that provides for securities and/or financial instrument analysis and which may be operated in connection with one or more electronic trading systems. However, it should be noted that embodiments are not limited to data access systems associated with securities and/or document analysis.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "configured to" requires that the processor(s) (and/or other components) is/are configured by program code to perform the recited activity. The term, when used in claim language, requires such configuration, and is thus reciting an actual state of configuration of the processor (and/or other components) so configured. The actual state of configuration fundamentally ties the action recited following the "configured to" phrase to the physical characteristics of the processor(s) (and/or other components) recited before the "configured to" phrase.

Additional Applications of Described Subject Matter

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A system comprising:
   at least one memory device configured to store an extract template for accessing data in a database, each extract template comprising a query to be run on the database, a set of input parameters and a set of output columns; and
   at least one processor configured to access the at least one memory device and to execute a data extract service program code, wherein the data extract service program code includes instructions which, when executed by the at least one processor, cause the at least one processor to perform operations comprising:
      in response to a first request message from a first client device, accessing the extract template in the at least one memory device and transmitting a first response message including information for displaying a first user interface enabling selection of a subset of the set of input parameters of the extract template;
      receiving first configuration information including a selected subset of the set of input parameters from the first client device;
      storing, in the at least one memory device, said first configuration information as an extract job template associated with the extract template;
      publishing an application program interface (API) endpoint for a second client device to access the saved extract job template;
      in response to a second request message from the second client device received via the published API endpoint:
         accessing the selected subset of the input parameters in the stored extract job template and transmitting a second response message including information for displaying a second user interface enabling the second client device to obtain client-specified values to the selected subset of the input parameters;
         receiving, from the second client device, client-specified values for one or more input parameters in the selected subset of the input parameters;

injecting, into the query, at least some of the received client-specified values to corresponding input parameters in the selected subset of the input parameters; and running said query with the injected client-specified values; and outputting results of said running of said query, the results including one or more output columns from the set of output columns in the extract template.

2. The system according to claim 1, wherein the first configuration information includes parameter requirement information associating a mandatory configuration setting and a dynamic configuration setting with at least one input parameter from the subset of input parameters, wherein the mandatory configuration setting associated with the at least one input parameter indicates whether it is mandatory to have a value for the at least one input parameter and the dynamic configuration setting associated with the at least one input parameter indicates whether the at least one input parameter is restricted to a corresponding value set in the extract job template, and wherein the operations further comprise, in response to the second request message, verifying said client-specified values against the parameter requirement information corresponding to each input parameter of the subset of input parameters.

3. The system according to claim 2, in response to the receiving said client-specified values, performing said running said query only when, for each input parameter in the subset of input parameters for which the corresponding mandatory configuration setting indicates that parameter as a mandatory parameter, a valid value is provided, and, for each input parameter in the subset of input parameters for which the corresponding dynamic configuration setting indicates that parameter as a non-dynamic parameter, using a value set for that parameter in the stored extract job template.

4. The system according to claim 1, wherein the operations further comprise, in response to the second request message:

accessing the stored extract job template based on a first identifier for the API endpoint, wherein the first identifier is included in the second request message;

validating at least one of said client-specified values for one or more input parameters in the selected subset of input parameters based on the stored extract job template;

accessing the extract template based on a second identifier for the extract template, wherein the second identifier is included in the stored extract job template; and, before said running the query, using said validated client-specified values for the injecting.

5. The system according to claim 4, wherein the running said query is performed with a system-specified value for at least one input parameter in the selected subset of input parameters.

6. The system according to claim 4, wherein the validating comprises, for each input parameter in the selected subset of input parameters for which a corresponding mandatory configuration setting in the stored extract job template indicates that parameter as a mandatory parameter, a valid value is provided, and, for each input parameter in the subset of input parameters for which a corresponding dynamic configuration setting in the extract job template indicates that parameter as a non-dynamic parameter, using a value set for that parameter in the stored extract job template.

7. The system according to claim 4, wherein the using said validated client-specified values for the injecting comprises accessing the query in the extract template and injecting said validated client-specified values as input parameters of the query.

8. The system according to claim 1, wherein the set of input parameters and the set of output columns have one or more parameters in common.

9. The system according to claim 1, wherein the at least one memory device includes stored permission information comprising a first level of permission, a second level of permission that is lower than the first level of permission, and a third level of permission that is lower than the second level of permission, wherein at least the first level of permission is required for a client device to modify the one or more extract templates, and at least the second level of permissions is required for the client device to display the first user interface.

10. The system according to claim 9, wherein the operations further comprise, in response to receiving the first request message, checking user permission information stored in the at least one memory device to determine whether the first client device and/or a user of the first client device is assigned permissions sufficient to save the first configuration information.

11. The system according to claim 1, wherein the stored extract job template includes an identifier of the extract template.

12. The system according to claim 1, wherein the outputting results comprises, in response to one or more polling request messages from a client device, transmitting the results to the second client device.

13. The system according to claim 1, wherein the outputting results comprises storing the results or providing the results to another application.

14. The system according to claim 1, wherein the first user interface includes user-selectable inputs for said saving, said publishing, and unpublishing published API endpoints.

15. The system according to claim 1, wherein each said first request message and the second request message are received by an application programming interface (API) gateway service before being processed by the extract service program code.

16. A method comprising:

at a system that includes at least one memory device, at least one processor, and at least one network interface device:

in response to a first request message from a first client device, accessing an extract template and transmitting a first response message including information for displaying a first user interface enabling selection of a subset of the set of input parameters of the extract template, wherein the at least one memory device stores one or more data extract templates for accessing data in a database, each data extract template comprising a query to be run on the database, a set of input parameters and a set of output parameters;

receiving first configuration information including a selected subset of the set of input parameters from the first client device;

storing, in the at least one memory device, said first configuration information as an extract job template associated with the extract template;

publish an application program interface (API) endpoint for a second client device to access the saved extract job template;

in response to a second request message from the second client device received via the published API endpoint:
  accessing the selected subset of the input parameters in the stored extract job template and transmitting a second response message including information for displaying a second user interface enabling the second client device to obtain client-specified values to the selected subset of the input parameters;
  receiving, from the second client device, client-specified values for one or more input parameters in the selected subset of the input parameters;
  injecting, into the query, at least some of the received client-specified values to corresponding input parameters in the selected subset of the input parameters; and
  running said query, of the extract template, with the injected client-specified values; and
  outputting results of said running of said query, the results including one or more output columns from the set of output columns in the extract template.

17. A non-transitory computer readable storage medium storing instructions that, when executed by one or more processors of a computing device, causes the computing device to perform operations comprising:
  in response to a first request message from a first client device, accessing an extract template and transmitting a first response message including information for displaying a first user interface enabling selection of a subset of the set of input parameters of the extract template, wherein the at least one memory device stores the one or more data extract templates for accessing data in a database, each data extract template comprising a query to be run on the database, a set of input parameters and a set of output parameters;
  receiving first configuration information including a selected subset of the set of input parameters from the first client device;
  storing, in the at least one memory device, said first configuration information as an extract job template associated with the extract template;
  publish an application program interface (API) endpoint for a second client device to access the saved extract job template;
  in response to a second request message from the second client device received via the published API endpoint:
    accessing the selected subset of the input parameters in the stored extract job template and transmitting a second response message including information for displaying a second user interface enabling the second client device to obtain client-specified values to the selected subset of the input parameters;
    receiving, from the second client device, client-specified values for one or more input parameters in the selected subset of the input parameters;
    injecting, into the query, at least some of the received client-specified values to corresponding input parameters in the selected subset of the input parameters; and
    running said query, of the extract template, with the injected client-specified values; and
  outputting results of said running of said query, the results including one or more output parameters from the set of output parameters in the extract template.

18. The system according to claim 1, wherein at least one of the input parameters in the set of input parameters is absent in the selected subset.

* * * * *